April 25, 1967 C. J. NAUTA 3,315,947
MIXING DEVICES
Filed July 13, 1965
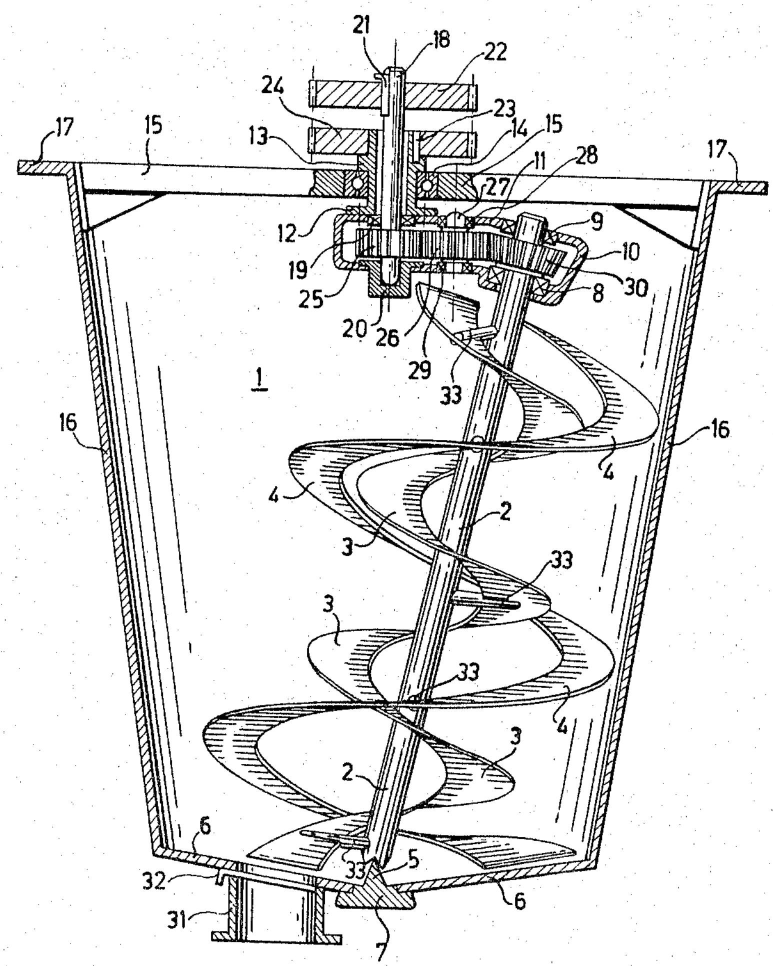

United States Patent Office 3,315,947
Patented Apr. 25, 1967

3,315,947

MIXING DEVICES

Constant J. Nauta, Bloemendaal, Netherlands, assignor to Nautamix N.V., Haarlem, Netherlands, a limited-liability company Filed July 13, 1965, Ser. No. 471,584
3 Claims. (Cl. 259—111)

This invention relates to new and useful improvements in mixing devices of the kind, for example, as disclosed in U.S. Patent No. 2,893,709, issued July 7, 1959, to Johannes Ewardus Nauta, which include one or more mixing vessels each with a side wall of circular cross-section which increases in diameter in an upward direction to form a frusto-conical shape and a bottom, one or more mixing elements in each vessel and each having a central shaft mounted, at its lower end in said bottom of the vessel and, at its upper end, in a driving mechanism for effecting rotation of said mixing element about its longitudinal axis and for revolving said mixing element at the same time about the central axis of said vessel, the distance between the addendum line of said mixing element throughout its whole length and the side wall of the vessel being kept constant as the rotating mixing element revolves in the vessel.

Known devices of the kind described above have a common disadvantage in that, in operation, each mixing element works substantially only as a conveyor element which transports the substances in one direction or the other along the shaft of said mixing element and only as a consequence of such transport effects mixing and kneading of the substances. Thus the main mixing and kneading results are obtained by the continuous transporting effect of each mixing element, whereby successively all substances treated in the vessel are exposed to an intense and uniform whirling action.

The object of the invention is to provide mixing devices of the kind described with mixing elements which directly effect the mixing and kneading of the substances in the mixing vessel and thereby greatly improve the quality of the mixing and kneading that is obtained. To this end, according to the invention, each mixing element is provided with at least two conveying members one of which produces a stream of substances in an inner zone lying in the immediate vicinity of the shaft of said mixing element and in the longitudinal direction thereof, while the other of said conveying members produces a stream of substances in the linearly opposed direction in an outer zone which is also within the reach of the mixing element, whereas the relative conveying capacities of said conveying members are such that the stream of substances in one direction is continuously more voluminous or has a greater flow rate than the stream of substances in the opposed direction.

The effect is that when the mixing device is in operation these opposed streams of substances within the reach of the mixing element directly produce a most effective mixing and kneading of the substances by means of the mixing element, and these opposed streams having different flow rates also continuously attract the substances treated in the vessel to one end of the mixing member, whereas at the opposed end of said mixing member the substances delivered by the stream of greater flow rate are returned only in part in an opposed direction within the reach of the mixing member, whereas the remainder of such substances is returned into the mass in the vessel beyond the reach of said mixing member.

An additional effect of the arrangement is that the vessel may be provided with a bottom wall of greater dimensions than are usual for devices of this kind and the slope of the outer or side wall of the vessel may be smaller than is usual.

Preferably the arrangement of the conveying members provided on the shaft of each mixing element is such that the stream of substances having the greater flow rate is in an inner zone lying in the immediate vicinity of the shaft of said mixing element and is in an upward direction. Moreover, it is advantageous to provide a mixing member having a circular circumference which increases in diameter in the upward direction to form a frusto-conical or conical shape.

The invention will be described in detail with reference to the drawing, which diagrammatically shows partly in elevation and partly in vertical section the essential parts of an embodiment of the invention.

The device comprises a mixing vessel 1 having a side wall 16 of circular cross-section which increases in diameter in the upward direction so as to have a frusto-conical shape and a wall 6 at the bottom of the vessel. A mixing member is disposed in vessel 1 and consists of a central shaft 2 provided with two conveying strips 3 and 4 each helically arranged about the shaft 2 and fixed to said shaft by means of cross bars 33. The central shaft 2 is supported rotatable at its lower end on the bottom 6 of the vessel 1 by means of a pointed bearing 5 integral with a body 7 securing the bearing 5 in the bottom 6 in a fixed position with respect to the vertical axes of vessel 1.

At its upper end, the shaft 2 of the mixing member is mounted rotatable in ball bearings 8 and 9 carried by a widened free end portion 10 of a hollow retaining arm 11. At its end adjacent the axis of the mixing vessel the retaining arm 11 is fixed on a flange 12 of a bushing 13 mounted rotatably in a supporting member 15 by means of a ball bearing 14. Said supporting member 15 is fixed, for example, on the top edge of the side wall 16 of the vessel 1, which top edge is provided advantageously with a relatively thick circular flange 17. Through the bushing 13 passes a shaft 18 which by means of a ball bearing 19 is mounted rotatably in the upper wall of the hollow arm 11 whereas said shaft 18 is supported on the lower wall of said hollow arm 11 by means of a step bearing 20 secured in said lower wall. On the upper end of shaft 18 is fixed a gear 22 by means of a wedge or key 21. On the upper end of bushing 13 is fixed a gear 24 by means of a wedge or key 23. Moreover in the space inside the hollow arm 11 a gear 25 is fixed on the shaft 18. This gear 25 engages an intermediary gear 26 having a shaft which, by means of the ball bearings 28 and 29, is mounted rotatably in the upper and lower walls of said hollow arm 11. The gear 26, in turn, engages a bevel gear 30 fixed on the upper end portion of shaft 2 within the space inside the hollow arm 11. When the gears 22 and 24 are simultaneously rotated, the mixing element is made to revolve, by means of the hollow arm 11, in the vessel 1 about the vertical central axis of said vessel whereas at the same time said mixing element is rotated about its longitudinal axis by means of the gears 25, 26, 30. Finally the bottom 6 of the vessel 1 is provided with an outlet 31 which can be closed by means of a slide valve 32.

As shown, the helical strip 3 is arranged nearer to the central shaft 2 of the mixing element than the helical strip 4. Further the helical strips 3 and 4 are relatively dimensioned and shaped so that, when the mixing member rotates about its longitudinal axis, the strip 3 propels the substance being mixed in the direction along the axis of shaft 2 which is opposed to the direction in which the substance is linearly propelled by helical strip 4, and conveying capacity of the helical strip 3 is greater than the conveying capacity of the helical strip 4. Therefore, when the mixing member is operated, it will transport in an inner zone in the immediate vicinity of the central shaft 2 a greater volume of substances to be treated than in that outer zone within the reach of said mixing element which is limited by the cross section of the helical strip 4. Consequently, the helical strip 3 exerts continuously at one end of the mixing member an attractive power on the substances treated in the vessel 1 and transports a certain volume of substances continuously in one direction only through the inner zone along the shaft to the other end of said mixing member, and the helical strip 4 acts to return, in the opposite direction through the outer zone of the mixing member, only a part of the substances moved by the helical strip 3, with the remainder of the substances moved by strip 3 being returned to the mass of the substances in vessel 1 outside the reach of the mixing member. Since simultaneous with its rotation about the axis of shaft 2, the mixing element revolves in the vessel about the central axis thereof, the most effective mixing and kneading of the substances will be ensured.

Of course, the mixing element may be rotated about its longitudinal axis in either direction so that the flow of substances in the inner zone in the immediate vicinity of the shaft can be directed either upward or downward.

What is claimed is:

1. In a mixing device for mixing and kneading substances and comprising a mixing vessel to receive said substances having a frusto-conical side wall with a substantially vertical central axis and increasing in diameter in the upward direction and a bottom wall, a mixing member in said vessel having a longitudinal shaft which is inclined with respect to said vertical central axis of the vessel, means carried by said bottom wall of the vessel supporting the lower end of said shaft, and drive means at the top of said vessel supporting the upper end of said shaft and being operative to effect rotation of said mixing member about the axis of said shaft and simultaneous revolving of said mixing member about said vertical central axis of the vessel with the outer periphery of said mixing member, along its entire length, being maintained at a constant distance from said side wall of the vessel; the improvement consisting of first and second conveying means fixedly mounted on said shaft at different radial positions with respect to the latter and being operative, upon said rotation of the mixing member, to convey substances in said vessel longitudinally along said shaft in opposed directions through first and second coaxial, annular zones, respectively, which are longitudinally coextensive along said shaft, said first conveying means having a greater conveying capacity than said second conveying means so that the flow rate of substances conveyed through said first zone in one longitudinal direction is greater than the flow rate of substances conveyed through said second zone in the opposite longitudinal direction, the volume swept by said first and second conveying means upon rotation of said mixing member being substantially less than the volume of said vessel so that substances in the vessel are drawn into, and conveyed through said first zone from one end of the mixing member and only a part of the substances conveyed through said first zone is returned through said second zone toward said one end of the mixing member with the remainder of said substances conveyed through said first zone being discharged from the mixing member to mingle with substances in said vessel outside of said volume swept by the first and second conveying means.

2. A mixing device according to claim 1, wherein said first conveying means are radially close to said shaft so that said first zone through which substances are conveyed at a relatively great flow rate is immediately adjacent to said shaft.

3. A mixing device according to claim 1; wherein said first and second conveying means are constituted by respective strips wound around said shaft helically in opposed direction.

References Cited by the Examiner

UNITED STATES PATENTS

| | | | |
|---|---|---|---|
| 1,825,261 | 9/1931 | Burns et al. | 259—9 |
| 2,003,829 | 6/1935 | Gilbert et al. | 259—102 |

FOREIGN PATENTS

| | | |
|---|---|---|
| 585,331 | 11/1958 | Italy. |
| 77,302 | 2/1955 | Netherlands. |

WALTER A. SCHEEL, *Primary Examiner.*

R. W. JENKINS, *Assistant Examiner.*